US008386942B2

(12) United States Patent
Barsook et al.

(10) Patent No.: US 8,386,942 B2
(45) Date of Patent: Feb. 26, 2013

(54) SYSTEM AND METHOD FOR PROVIDING DIGITAL MULTIMEDIA PRESENTATIONS

(75) Inventors: Jonathan David Barsook, Los Angeles, CA (US); Matthew Paul Bice, San Francisco, CA (US); Marieke Iwema Watson, Redmond, WA (US)

(73) Assignee: Disney Enterprises, Inc., Burbank, CA (US)

( * ) Notice: Subject to any disclaimer, the term of this patent is extended or adjusted under 35 U.S.C. 154(b) by 649 days.

(21) Appl. No.: 12/228,508

(22) Filed: Aug. 12, 2008

(65) Prior Publication Data

US 2009/0259955 A1 Oct. 15, 2009

Related U.S. Application Data

(60) Provisional application No. 61/124,193, filed on Apr. 14, 2008.

(51) Int. Cl.
*G06F 3/048* (2006.01)
(52) U.S. Cl. ........................................................ 715/764
(58) Field of Classification Search .................... 715/764
See application file for complete search history.

(56) References Cited

U.S. PATENT DOCUMENTS

| | | | | |
|---|---|---|---|---|
| 5,528,735 A * | 6/1996 | Strasnick et al. | ............ | 345/427 |
| 5,623,613 A * | 4/1997 | Rowe et al. | ............ | 715/841 |
| 6,393,158 B1 * | 5/2002 | Gould et al. | ............ | 382/254 |
| 7,539,934 B2 * | 5/2009 | Kender et al. | ............ | 715/233 |
| 2002/0032905 A1 * | 3/2002 | Sherr et al. | ............ | 725/38 |
| 2003/0011627 A1 * | 1/2003 | Yager et al. | ............ | 345/700 |
| 2003/0088420 A1 * | 5/2003 | alSafadi et al. | ............ | 704/270.1 |
| 2004/0073935 A1 * | 4/2004 | Kang | ............ | 725/88 |
| 2004/0088729 A1 * | 5/2004 | Petrovic et al. | ............ | 725/91 |
| 2004/0177149 A1 * | 9/2004 | Zullo et al. | ............ | 709/228 |
| 2004/0199923 A1 * | 10/2004 | Russek | ............ | 719/310 |
| 2004/0210896 A1 * | 10/2004 | Chou et al. | ............ | 717/174 |
| 2005/0204389 A1 * | 9/2005 | Proehl et al. | ............ | 725/60 |
| 2006/0014493 A1 * | 1/2006 | Haller et al. | ............ | 455/41.3 |
| 2006/0064716 A1 * | 3/2006 | Sull et al. | ............ | 725/37 |
| 2006/0129909 A1 * | 6/2006 | Butt et al. | ............ | 715/500.1 |
| 2006/0253417 A1 * | 11/2006 | Brownrigg et al. | ............ | 707/1 |
| 2007/0156521 A1 * | 7/2007 | Yates | ............ | 705/14 |
| 2007/0250864 A1 | 10/2007 | Diaz | | |
| 2007/0260695 A1 * | 11/2007 | Fenton | ............ | 709/207 |
| 2008/0040741 A1 | 2/2008 | Matsumoto | | |
| 2009/0125571 A1 * | 5/2009 | Kiilerich et al. | ............ | 707/204 |
| 2009/0164601 A1 * | 6/2009 | Swartz | ............ | 709/217 |
| 2009/0217352 A1 * | 8/2009 | Shen et al. | ............ | 726/3 |

OTHER PUBLICATIONS

Google, New Feature: Embed video with a specific start point (2006) http://googlevideo.blogspot.com/2006/08/new-feature-embed-videos-with-specific.html.

* cited by examiner

*Primary Examiner* — Phenuel Salomon
(74) *Attorney, Agent, or Firm* — Farjami & Farjami LLP

(57) ABSTRACT

There is presented a system and method for providing a digital multimedia presentation. The system comprises a presentation server and a presentation content database configured to store a plurality of digital multimedia content items, accessible through the presentation server. The system also comprises a presentation control application configured to enable identification of a digital multimedia content item for presentation from among the plurality of digital multimedia content items. The presentation control application is configured to organize the plurality of digital multimedia content items into digital multimedia content sets displayed on a selection plane, enable navigation in a first navigation mode on the selection plane, group the plurality of digital multimedia content items into grouping subsets displayed on a presentation plane, enable navigation in the first navigation mode on the presentation plane, and enable navigation in a second navigation mode between the selection plane and the presentation plane.

16 Claims, 6 Drawing Sheets

SYSTEM AND METHOD FOR PROVIDING DIGITAL MULTIMEDIA PRESENTATIONS

RELATED APPLICATIONS

This application claims priority to U.S. Provisional Application No. 61/124,193, filed on Apr. 14, 2008, which is hereby incorporated by reference in its entirety.

BACKGROUND OF THE INVENTION

1. Field of the Invention

The present invention relates generally to the management of media content. More particularly, the present invention relates to computer mediated selection of media content.

2. Background Art

The search for web content is now both easier, and yet more challenging for consumers than ever before. The search for web content is made easier by the vast and ever growing body of content available online. Whether a consumer seeks music, television programming, videos, or movies, for example, they are all out there in digital multimedia presentation form, just waiting to be accessed. At the same time, however, the search for web content has become more challenging in the sense that accessing particularly desirable content may be more difficult because of the plethora of alternatives competing for the consumer's attention. In effect, the clamorous availability of so much content so easily obtained, may serve as a significant distraction, and may make it that much more unlikely that the consumer will successfully identify and locate content of genuine interest to them.

For the consumer, identifying and locating content of real interest from amid the much greater body of similarly available content that may be more distracting than satisfying, can be a time consuming and frustrating experience. The active efforts required in order to differentiate among alternative content items to distinguish those presentations holding genuine interest for the consumer, may undermine the pleasure otherwise obtainable from a more seamless and immediate access to those presentations. Consequently, the wealth of desirable content available to the consumer, in principle, may be rendered far less enjoyable than it might otherwise be, in fact, by being obscured and made less accessible due to its own superabundance.

For example, consider the case of a consumer seeking to access a digital multimedia presentation corresponding to desirable television programming, online. A conventional approach to providing the digital multimedia presentation utilizes standard computer based information management tools to assist the consumer in identifying the desired presentation from a library of available content items. According to that approach, the consumer might be required to sort through the available content items, categorized according to genre, subject matter, or other criteria, to locate a particular desired presentation. This approach provides the consumer with some ability to discriminate among available content items according to broad themes, but provides a relatively rudimentary means for discovering the specific presentation of genuine interest. That is to say, one significant disadvantage of this conventional approach is that unless the search strategy employed by the consumer is well thought out and targeted, the consumer may be presented with a multitude of content items to evaluate, many of which may be of only marginal relevance to the consumer's focal interest.

Another significant disadvantage of the conventional approach flows from the iterative nature of the search process. Because a typical consumer may not be a particularly sophisticated searcher, identification of the desired presentation often requires that a search be refined in several stages, before a substantial number of less desirable content items are winnowed out. However, conventional user interfaces provided to assist in content management offer little in the way of navigational cueing, to assist the consumer in recognizing their present location on a search path through the contents of the presentation library. As a result, a consumer may become disoriented just as their search becomes sufficiently well defined to close in on the subset of presentations really of interest to them, and may experience unnecessary difficulty in isolating the most desirable presentations as a result.

Accordingly, there is a need to overcome the drawbacks and deficiencies in the art by presenting a solution for providing digital multimedia presentations that organizes and displays available web content so as to enable a consumer to engage and evaluate that content in an intuitive way, thereby facilitating identification of a presentation that is of genuine interest to the consumer.

SUMMARY OF THE INVENTION

There are provided systems and methods for providing digital multimedia presentations, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

Figure 1:
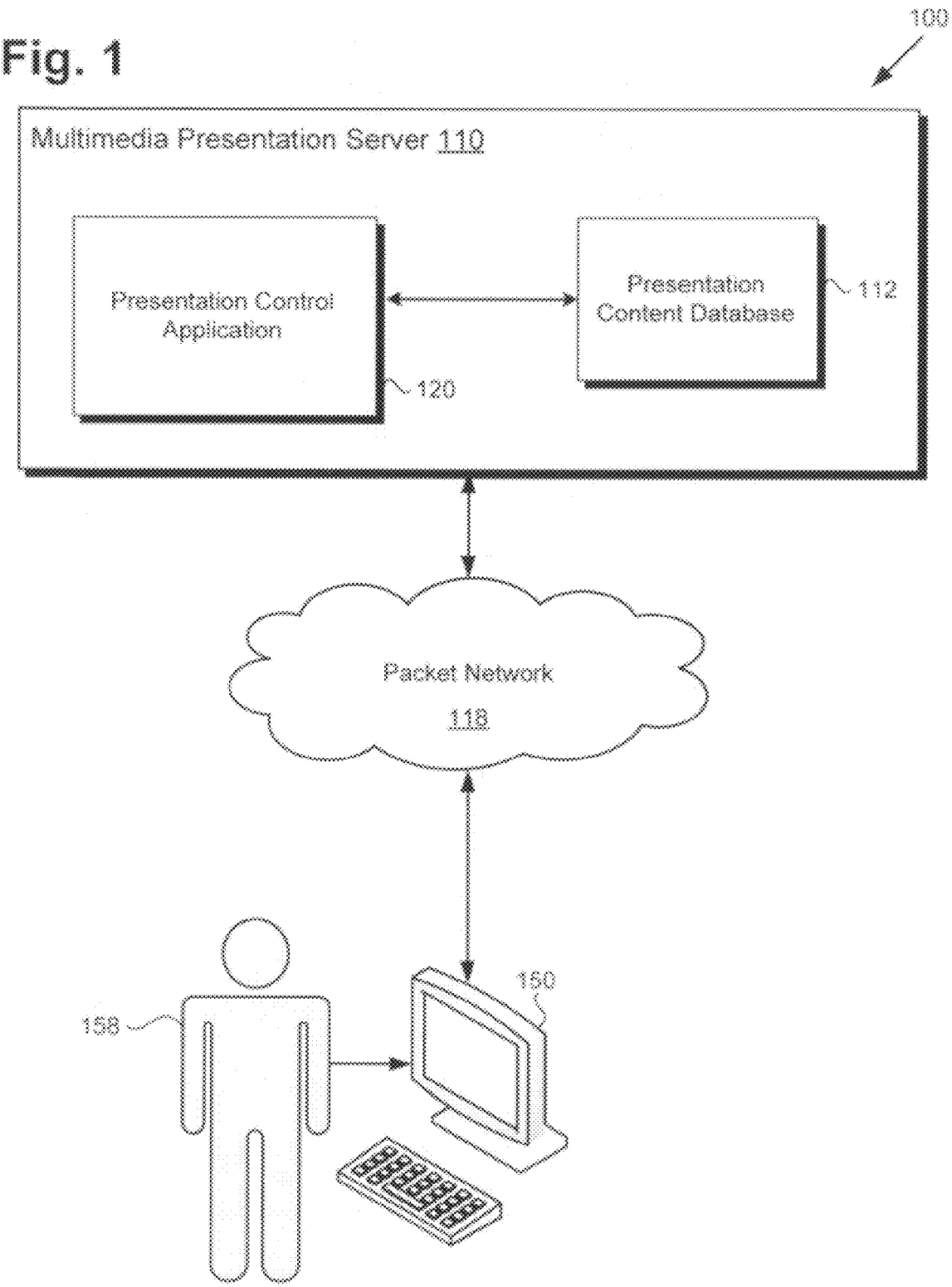
FIG. 1 shows a block diagram of a system for providing digital multimedia presentations, according to one embodiment of the present invention.

The present application is directed to a system and method for providing digital multimedia presentations. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings. It should be borne in mind that, unless noted otherwise, like or corresponding elements among the figures may be indicated by like or corresponding reference numerals.

FIG. 1 is a block diagram of system 100 for providing digital multimedia presentations, according to one embodiment of the present invention. In the embodiment of FIG. 1, system 100 comprises multimedia presentation server 110 including presentation content database 112 and presentation control application 120. Also included in FIG. 1 are packet network 118, client computer 150, and consumer 158. It is noted that although client computer 150 is represented as a personal computer (PC) in FIG. 1, in other embodiments client computer 150 may comprise another type of mobile or stationary personal communication device or system, such as a tablet computer, mobile telephone, personal digital assistant (PDA), gaming console, or home entertainment system, for example.

According to the embodiment of FIG. 1, consumer 158 may utilize presentation control application 120 to access content available on presentation content database 112. Presentation control application 120 may be configured to provide a user interface enabling consumer 158 to become informed about, preview, select, and play one or more items of digital multimedia content available on presentation content database 112. Presentation control application 120 may utilize more than one visual display space and more than one navigation mode to enable consumer 158 to identify and view desired content, grouped for instance by sets and subsets. For example, a collection of digital multimedia content items corresponding to television (TV) programming may be grouped by digital multimedia content set according to genre, i.e., drama versus comedy, or simply according to the identity of a particular series of episodic programming, such as the programs "Lost" or the program "Grey's Anatomy." Navigation among genres or series might occur on a virtual two-dimensional selection plane on which a lateral navigation mode is enabled, so that transition from one genre set to another or from overview of one episodic series set to another is shown as a lateral shift produced by substitution of a visual frame by another visual frame moving in from the left or right on an x-y plane, for example.

Selection of a digital multimedia content set might be associated with a zoom navigation mode in which the visual perspective provided to consumer 158 undergoes a z-axis zoom transition into a visual image corresponding to the digital multimedia content set, to reveal a plurality of grouping subsets associated with the selected set. The plurality of grouping subsets might be displayed on a presentation plane on which, once again, lateral navigation may be enabled. Continuing with the example of digital multimedia content items corresponding to series TV, selection of the series Lost on the selection plane may result in zoom navigation into an icon or visual image representing the series Lost, to reveal groupings of episodes by season, as grouping subsets of the series set. Those season specific grouping subsets might then be displayed on a presentation plane on which transitions among seasons and individual episodes can be enabled as lateral navigations, as previously described.

Presentation control application 120 may be further utilized by consumer 158 to tailor presentation of a digital multimedia content item to his or her personal preferences or consumption needs. In one embodiment, for example, presentation control application 120 may be utilized to select between high-definition (HD) content and normal definition content. In one embodiment, presentation control application 120 may be used to scale a viewing pane on which presentation of a selected item of digital multimedia content takes place. Scaling may correspond to providing a plurality of predetermined viewing pane sizes for selection by consumer 158. In one embodiment, scaling may comprise allowing consumer 158 to adjust the size of the viewing pane to any size consistent with the physical constraints of the display on which it is provided.

In addition, presentation control application may support features enabling consumer 158 to choose a language for presentation of the selected digital multimedia content. In one embodiment, presentation control application 120 enables consumer 158 to include closed captioning and scales the closed captioning text pane according to the scaling of the viewing pane. In another embodiment, presentation control application 120 coordinates display of a parental rating assigned to an item of digital multimedia content according to a parental rating display protocol. Such a protocol may specify display of the parental rating prior to, and periodically during, presentation of a selected digital multimedia content item, for example.

In one embodiment, the parental rating display protocol observed by presentation control application 120 may require display of a parental rating corresponding to a digital multimedia content item for a period of at least fifteen seconds. Moreover, the parental rating display protocol observed by presentation control application 120 may assure that the parental rating is displayed not less frequently than once every thirty minutes during a presentation. In one embodiment, the parental rating may be displayed anew each time consumer 158 is redirected briefly away from a presentation session, during an advertising interval, for example. In one embodiment, the parental rating may be displayed at resumption of playback after a pause, or after thirty minutes have elapsed regardless of progression time through the presentation.

As shown in FIG. 1, presentation control application 120 may be accessed through packet network 118. In that instance, presentation control application 120 may comprise a web application, accessible over a packet network such as the Internet, configured to execute as a server based application on multimedia presentation server 110, for example. Alternatively, presentation control application 120 may reside on a server supporting a local area network (LAN), or be included in another type of limited distribution network. In another embodiment, presentation control application 120 may be stored on a portable computer-readable storage medium such as a compact disc read-only memory (CD-ROM).

Figure 2:
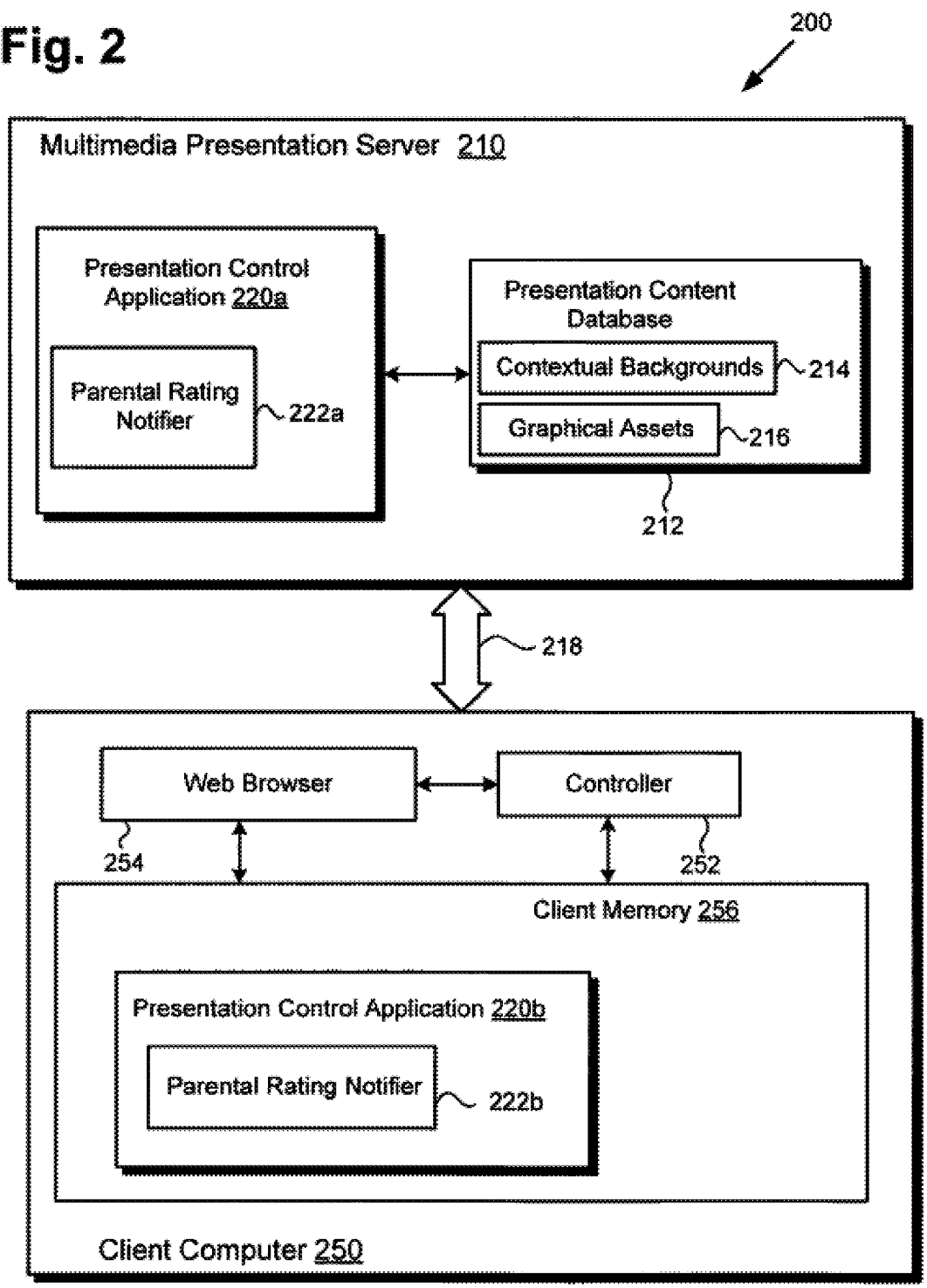
FIG. 2 shows a more detailed embodiment of a system for providing digital multimedia presentations, according to one embodiment of the present invention.

Turning now to FIG. 2, FIG. 2 shows a more detailed embodiment of system 200 for providing digital multimedia presentations, according to one embodiment of the present invention. System 200 in FIG. 2 includes client computer 250, receiving a download via communication link 218 from multimedia presentation server 210. Multimedia presentation server 210 is shown to comprise presentation content database 212 including contextual backgrounds 214 and graphical assets 216, and presentation control application 220*a* including parental rating notifier 222a. Presentation content database 212 and presentation control application 220a, in FIG. 2, correspond respectively to presentation content database 112 and presentation control application 120, in FIG. 1. Moreover, client computer 250, in FIG. 2, corresponds to client computer 150, in FIG. 1. As shown in FIG. 2, client computer 250 comprises controller 252, web browser 254, and client memory 256. Also shown in FIG. 2 is presentation control application 220b including parental rating notifier 222b.

According to the embodiment shown in FIG. 2, presentation control application 220b is located in client memory 256, having been received from multimedia presentation server 210 via communication link 218. In the present embodiment, communication link 218 represents download of presentation control application 220a, over a packet network, for example. In another embodiment, communication link 218 may represent transfer of presentation control application 220a from a CD-ROM or other computer-readable storage medium. Once transferred, presentation control application 220b may be stored in client memory 256 and executed locally on client computer 250, as a desktop application, for example. It is noted that communication link 218 is shown as a two-way communication, to represent ongoing communication between client computer 250 and presentation content database 212 on multimedia presentation server 210.

Controller 252 may be the central processing unit for client computer 250, for example, in which role controller 252 runs the client computer operating system, launches web browser 254, and facilitates use of presentation control application 220b. Web browser 254, under the control of controller 252, may execute presentation control application 220b to enable a consumer to access and enjoy digital multimedia content available through multimedia presentation server 210.

Figure 3:
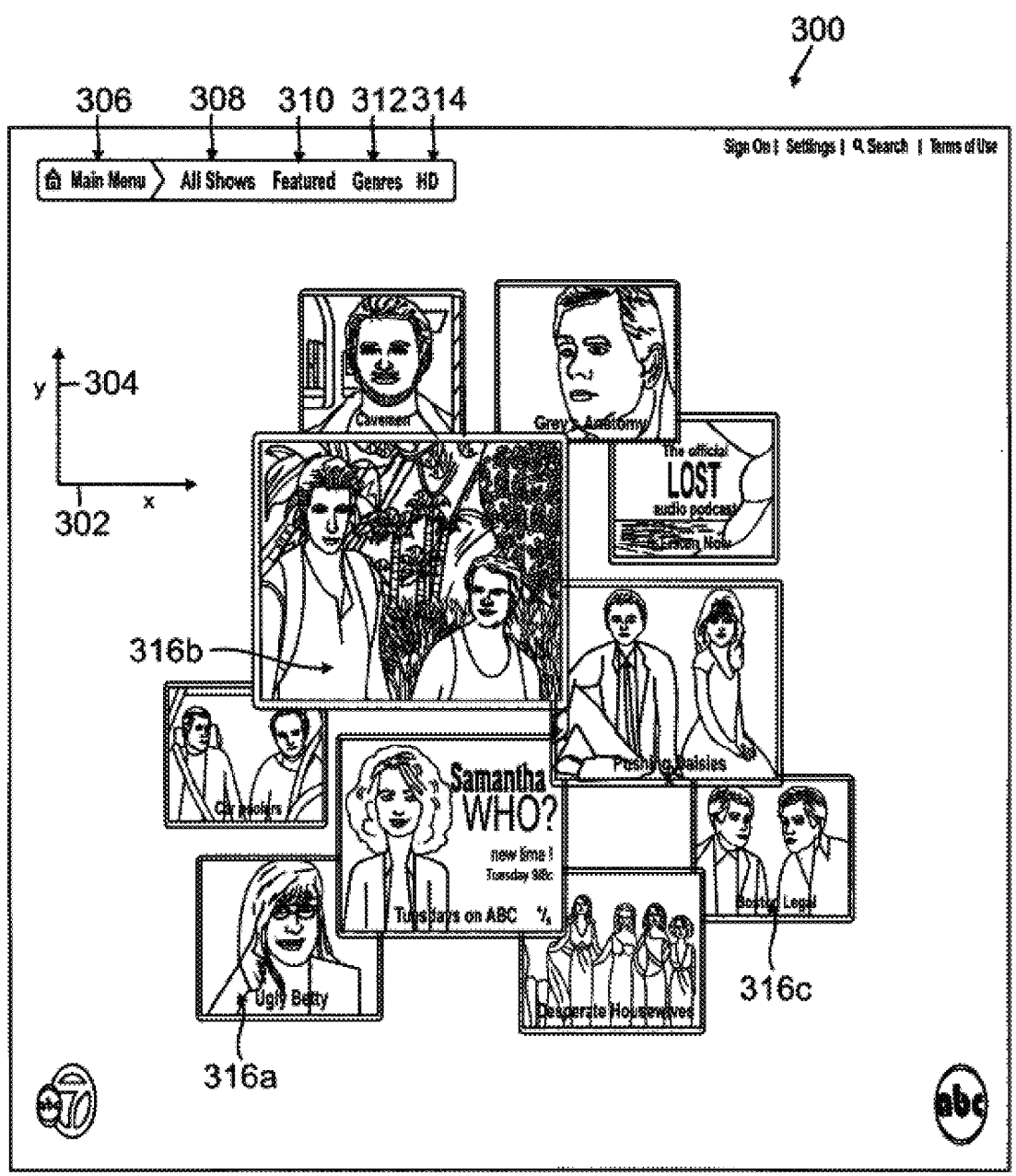
FIG. 3 shows a visual frame on which is captured a portion of an exemplary selection plane showing images corresponding to various digital multimedia content sets, according to one embodiment of the present invention.
Figure 4:
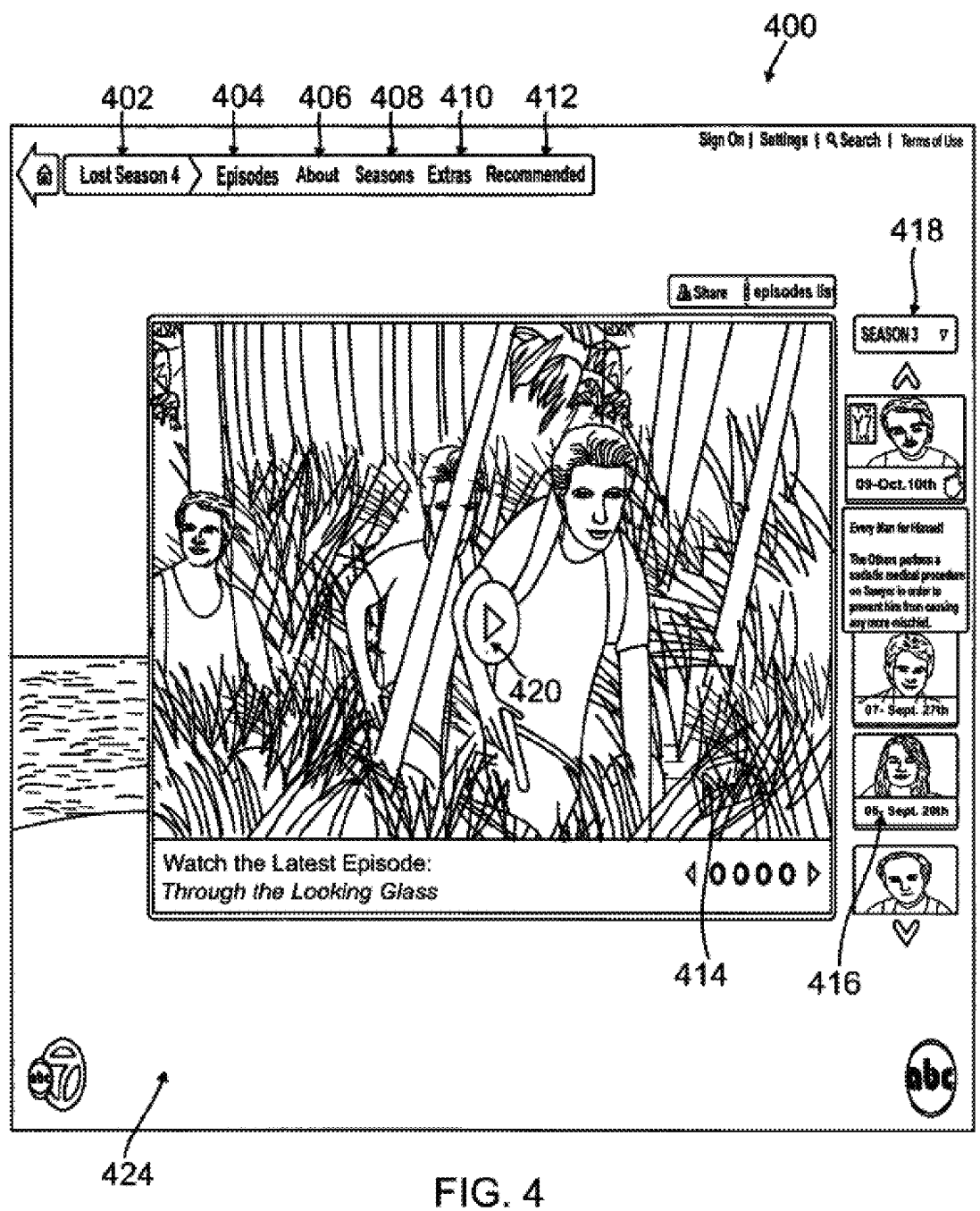
FIG. 4 shows a visual frame on which is captured a portion of an exemplary presentation plane showing images corresponding to digital multimedia content items contained within one of the digital multimedia content sets shown in FIG. 3, according to one embodiment of the present invention.

The systems shown in FIG. 1 and FIG. 2 may be used to enable a consumer to select and enjoy a digital multimedia presentation, in an online viewing session as streaming media sent to client computer 150 or 250, for example. Various embodiments of the present invention providing that functionality will now be further described by reference to FIGS. 3, 4, and 5, in addition to FIGS. 1 and 2. FIG. 3 shows visual frame 300, on which is captured a portion of a selection plane showing images corresponding to various digital multimedia content sets, according to one embodiment of the present invention. FIG. 4 shows visual frame 400, on which is captured a portion of a presentation plane showing images corresponding to digital multimedia content items contained within one of the digital multimedia content sets shown in FIG. 3, according to one embodiment of the present invention. Visual frame 300 and visual frame 400 may be displayed on either or both of client computers 150 and 250, shown in respective FIGS. 1 and 2. It is noted that although for clarity of presentation, portions of the following description focus on one or the other of the systems shown by FIGS. 1 and 2, both systems are capable of providing the digital multimedia presentation in the manner described.

Figure 5:
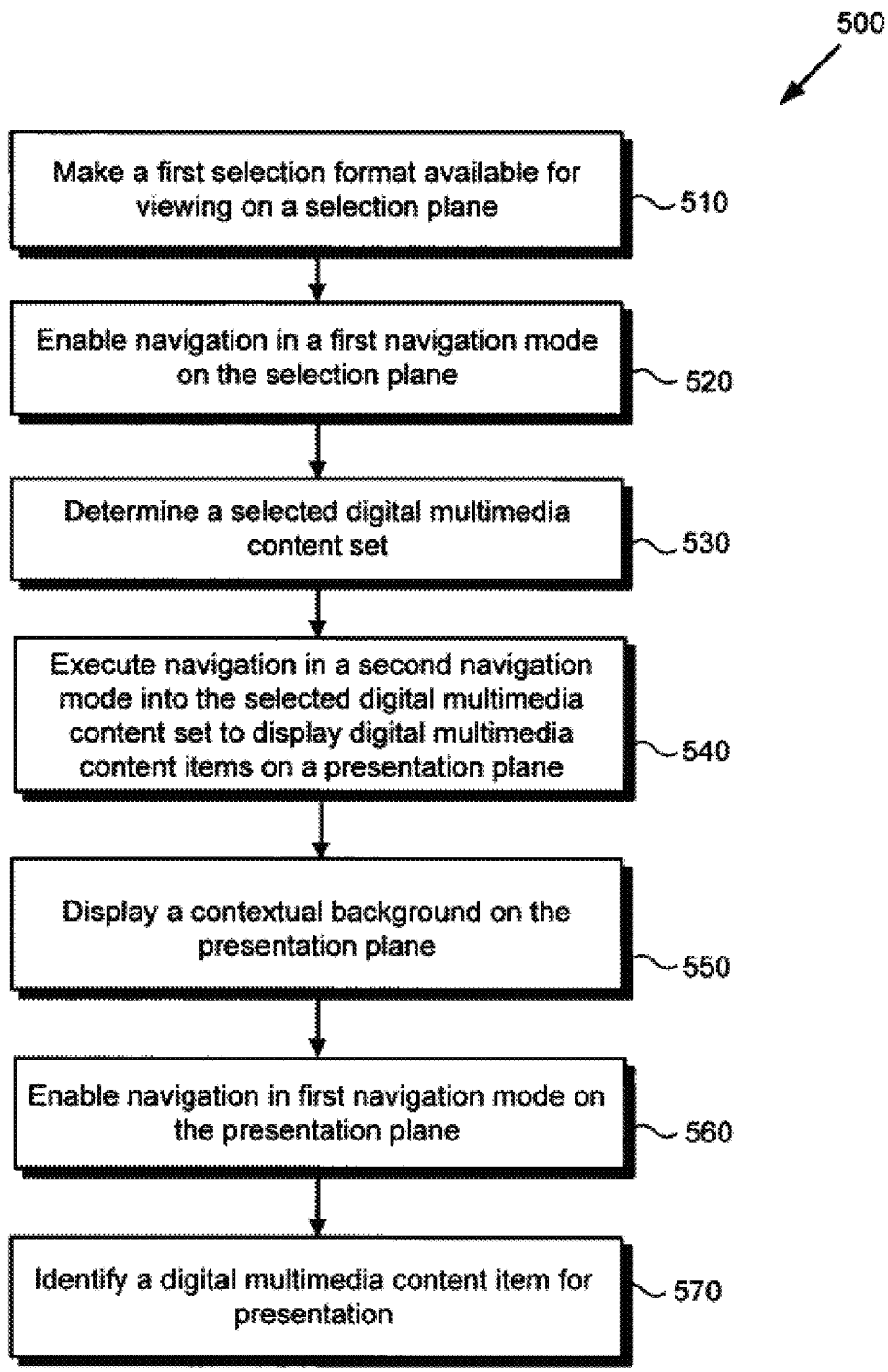
FIG. 5 is a flowchart presenting a method for providing digital multimedia presentations, according to one embodiment of the present invention.

FIG. 5 shows flowchart 500 describing the steps, according to one embodiment of the present invention, of a method of providing a digital multimedia presentation. Certain details and features have been left out of flowchart 500 that are apparent to a person of ordinary skill in the art. For example, a step may comprise one or more substeps or may involve specialized equipment or materials, as known in the art. While steps 510 through 570 indicated in flowchart 500 are sufficient to describe one embodiment of the present method, other embodiments may utilize steps different from those shown in flowchart 500, or may include more, or fewer steps.

Referring to step 510 of flowchart 500 in conjunction with FIGS. 1 and 3, step 510 comprises making a first selection format available for viewing on a selection plane. Step 510 corresponds, for example, to formatting and display of digital multimedia content available on presentation content database 112. Formatting and display of the available content may be performed by presentation control application 120, which mediates access to digital multimedia presentation content accessible through multimedia presentation server 110. As a specific but non-limiting example, let us consider digital multimedia content corresponding to programming presented by a TV network, such as the American Broadcasting Company (ABC), for instance, and accessible through the website ABC.com. Visual frame 300, in FIG. 3, shows the result of performing step 510 of flowchart 500, for the described content.

FIG. 3 shows a portion of the selection plane, which for the purposes of the present application may be thought of as a virtual two-dimensional space, i.e., an x-y plane coplanar with visual frame 300, as shown by representative x-axis 302 and representative y-axis 304. It is noted that representative x and y axes 302 and 304 are provided merely to orient the reader, and would not be visible to a consumer, such as consumer 158, in FIG. 1. Different portions of the selection plane may display the variety of content available for consumption in a number of alternative selection formats. An initially displayed, or first selection format, may be predetermined, or may be determined by presentation control application 120 according to one or more discrimination criterion, for example. Alternative selection formats may be utilized to display the available plurality of digital multimedia content sets according to consumer preferences, such as, for instance, past consumption patterns of the consumer.

It is noted that although in the present embodiment, all content accessible through multimedia presentation server 110 comes from a single source, i.e. ABC, in other embodiments, content from multiple sources may be available, either on presentation content database 112, or on other presentation content databases accessible through multimedia presentation server 110. In those embodiments, the present method may be adapted by addition of a preliminary source determination step, prior to step 510, in which the consumer is provided an opportunity to select a digital multimedia content source, such as ABC, ESPN, Disney, or SOAPnet, for example, from options shown on a source determination plane (not represented in the present figures).

Continuing with FIG. 3 and the exemplary method shown by flowchart 500, the selection plane of step 510 corresponds to main menu 306, from which content organized into a plurality of digital multimedia content sets according to ABC TV series can be viewed in four alternative selection formats including All Shows 308, Genres 312, HD 314, and the presently displayed Featured format 310. According to the Featured format displayed by visual frame 300, the ABC programs Lost, Ugly Betty, and Boston Legal, for example, are represented by respective visual images 316a, 316b, and 316c. The consumer can interact with the content represented in FIG. 3 in a number of ways. For example, by placing a display cursor over a particular visual image, the display may be adjusted to bring that visual image to the forefront of the visual frame, and the consumer may be shown a video trailer providing a sample of the content set associated with the image. Alternatively, by clicking on, or otherwise selecting a visual image, the consumer may gain access to the contents of that digital multimedia content set. In one embodiment, failure of the consumer to interact with the visual images corresponding to the digital multimedia content sets at all, may result in sequential playing of video trailers for each program, in an ordering controlled by presentation control application 120.

Other available selection formats may organize content differently, display visual images according to different patterns, and support different interactive features. For example, All Shows 308 may present a matrix of thumbnail visual images, or a text list of program titles, representing all available programs arranged alphabetically. Genres 312 may group and display digital multimedia content sets by program genre, such as comedy, drama, adventure, reality programming, and the like. HD 314, may provide formatting similar to any or all of the other formats, but selectively display only that content available as high-definition content.

The method of flowchart 500 continues with step 520, which comprises enabling navigation in a first mode on the selection plane. One of the many consumer friendly advantages provided by the present invention, is the intuitive nature of features supported by the user interface. Among those features is hierarchically directional navigation. Hierarchically directional navigation refers to enabling navigation in a first navigation mode among content groupings organized in a common display space, such as the selection plane, and enabling navigation in a second navigation mode between complementary but distinct display spaces, such as between the selection plane and a presentation plane, for example.

For the purposes of describing the present embodiment, the respective complementary display spaces are characterized as planes, while the first navigation mode corresponds to lateral navigation and the second navigation mode corresponds to zoom navigation. In other embodiments, however, the respective display spaces may be quite different from the selection plane and presentation plane described here. For example a display space may comprise the boundary of a closed surface, and a complimentary display space may comprise the interior region of the closed surface. In that embodiment, the first navigation mode may correspond to movement along the surface boundary, while the second navigation mode may correspond to movement into the interior region, for instance.

Returning to the embodiment shown in FIG. 3, enabling lateral navigation on the selection plane permits visual transitions including movement of selected coplanar content into visual frame 300 from the left or right, and from above and below. In FIG. 3, for example, selection of HD 314 from Main Menu 306 may result in a lateral transition of the first selection format shown in visual frame 300 out of the display area through lateral translation to the left, i.e. in the negative "x" direction as shown by x-axis 302. The selection format corresponding to HD content, in this instance a second selection format, could concurrently transition into the display area using a lateral motion from the right, i.e., from the positive "x" direction.

Flowchart 500 continues with step 530, comprising determining a selected digital multimedia content set. Determination of a selected digital multimedia content set from among the plurality of digital multimedia content sets shown on the selection plane may be performed by presentation control application 120, for example, in response to inputs received from consumer 158. As was noted earlier, client computer 150 utilized by consumer 158 may be selected from a variety of personal communication devices and systems, as previously described. Consequently, consumer 158 may employ a corresponding variety of possible local inputs, such as mouse commands, touch screen commands, keyboard commands, and the like, to provide the inputs allowing presentation control application 120 to determine a selected digital multimedia content set in step 530.

Moving on to step 540 of flowchart 500, step 540 comprises executing navigation in a second navigation mode into the selected digital multimedia content set to display digital multimedia content items on a presentation plane. As previously discussed, in the present embodiment, the second navigation mode corresponds to zoom navigation, while the presentation plane corresponds more generally to a display space complementary to the display space presently characterized as the selection plane. Like the selection plane described in reference to step 510, the presentation plane refers to a virtual two-dimensional space occupying an x-y plane. In the case of the presentation plane, which may be thought of as distinct from but parallel to the selection plane, a plurality of digital multimedia content items are grouped into grouping subsets associated with the selected digital multimedia content set determined in previous step 530.

Zoom navigation may be seen to correspond to a translation along a virtual z-axis (not shown in the figures) perpendicular to the plane formed by x-axis 302 and y-axis 304, in FIG. 3. As mentioned, one of the advantages provided by the present invention is that browsing for and identifying digital multimedia content desirable to a consumer becomes more intuitive for the consumer. One of the ways that this advantage is achieved is by providing hierarchically directional navigation, represented in the present embodiment by zoom navigation from one hierarchical level, or plane, to another, and lateral navigation among coplanar content groupings.

Turning now to FIG. 4, FIG. 4 shows visual frame 400, on which is captured a portion of the presentation plane showing images corresponding to digital multimedia content items contained within one of the digital multimedia content sets shown in FIG. 3, according to one embodiment of the present invention. For example, selection of visual image 316b representing the digital multimedia content set corresponding to the program Lost, by the consumer, may result in zoom navigation to visual frame 400, in FIG. 4. Visual frame 400 shows a portion of the presentation plane on which a grouping subset of digital multimedia content items relating to Lost Season 4 is shown. The displayed grouping subset is indicated by grouping subset label 402, formatted for display in visual frame 400 by Episodes 404. Alternative display formats for content contained within grouping subset Lost Season 4 are shown by the selection buttons for About 406, Seasons 408, Extras 410, and Recommended 412. It is noted that in other embodiments, digital multimedia content items may be organized according to grouping subsets and have display formats different from those shown in FIG. 4.

Continuing with the embodiment shown by visual frame 400, the Episodes 404 display format groups content items into a grouping subset corresponding to the fourth season episodes of the ABC program Lost. As a result, a consumer seeking that content may more readily locate it among the plethora of temporarily less desirable content available on presentation content database 112. For example, viewing pane 414 shows a frame of a featured episode. The featured episode may be determined by presentation control application 120 based on a variety of criteria. For instance, the featured episode may be the first, or the last, episode of a completed season of programming. When an uncompleted season is selected by the consumer, the featured episode may be the latest, most recently aired episode, as shown in FIG. 4, for example. Visual frame 400 includes thumbnail visual images representing other episodes of Lost Season 4, such as thumbnail visual image 416 representing episode 06. Visual frame 400 also includes navigation button 418 enabling easy access to the episodes of Season 3, as well as play button 420.

Step 550 of flowchart 500 comprises displaying a contextual background on the presentation plane corresponding to the selected digital multimedia content set and the grouping subsets. Step 550 may correspond to display of contextual backgrounds 214 and appropriate graphical assets 216, drawn from presentation content database 212, under the control of presentation control application 220a or 220b, in FIG. 2, for example. The effect of performing step 550 is shown on visual frame 400, by contextual background 424, which shows an uninhabited tropical beachscape, corresponding to the geographical theme of the program Lost.

In one embodiment, contextual background 424 may be dynamic, perhaps including one or more dynamic graphical asset such as a search plane (not shown in FIG. 4) that might circle continuously in the background sky for example. Alternatively, contextual background 424 might be made dynamic by virtue of simulating the daily solar cycle, by displaying a daylight background sky during some portions of the day, and a dawn, sunset, or nightfall background at other appropriate times. In addition, in some embodiments, contextual background 424 may include interactive graphical assets such as consumer polls, games, puzzles, questions, or interactive advertising graphics, for example.

The method of FIG. 5 continues with step 560, which comprises enabling navigation in the first navigation mode on the presentation plane. As explained previously, in the present embodiment, the first navigation mode corresponds to lateral navigation. Lateral navigation on the presentation plane is supported and controlled in a manner similar to lateral navigation on the selection plane, described previously in conjunction with step 520, and will not be further described here.

Continuing with step 570 of flowchart 500, step 570 comprises identifying a digital multimedia content item for presentation. Identification of a digital multimedia content item for presentation may be performed by presentation control application 220a or 220b, for example, in response to selection inputs received from the consumer. Turning again to FIG. 4, it may be seen that the consumer can interact with the portion of the presentation plane shown by visual frame 400 in a number of ways. One of those possible interactions is selection of play button 420, for example, which supplies an input sufficient for identification of the digital multimedia content item featured on viewing pane 414 for presentation.

Step 570 may be followed by sending the identified digital multimedia content item for presentation to client computer 150 or 250, as streaming media for example. In some embodiments, additional features may be activated, either automatically by presentation control application 220a or 220b, in FIG. 2, or in response to consumer selections. In one embodiment, for example, presentation may include closed captioning, or subtitles, in addition to audio and video presentation of the identified digital multimedia content item. In another embodiment, presentation may include periodic display of a parental rating assigned to the digital multimedia content item, by parental notifier 222a or 222b. An example of that later embodiment is shown by FIG. 6.

Figure 6:
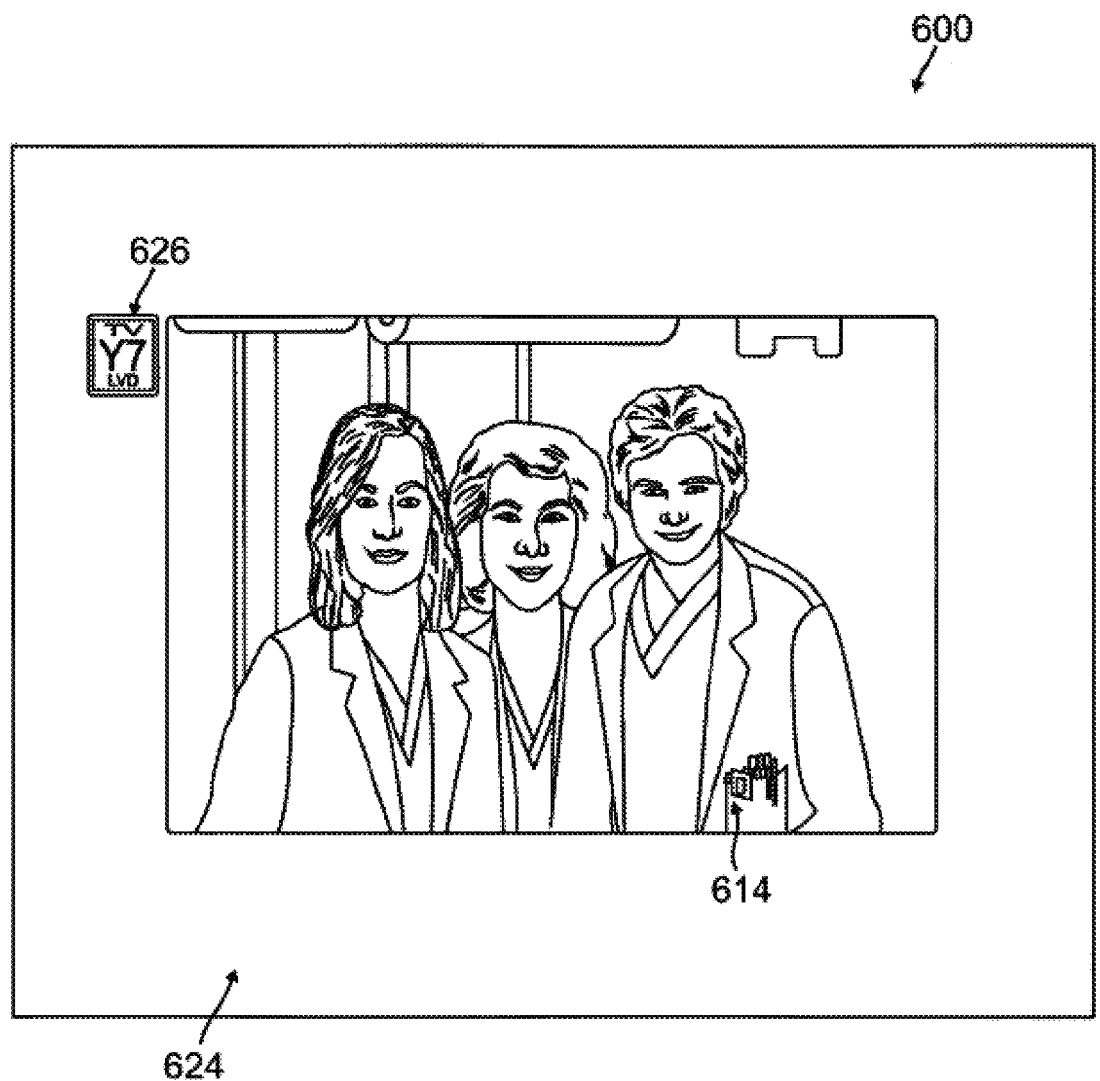
FIG. 6 shows a visual frame of an exemplary presentation of a digital multimedia content item corresponding to an episode of the ABC TV program Grey's Anatomy, displaying a parental rating, according to one embodiment of the present invention.

Turning to FIG. 6, FIG. 6 shows visual frame 600 of an exemplary presentation of a digital multimedia content item corresponding to an episode of the ABC TV program Grey's Anatomy, displaying a parental rating, according to one embodiment of the present invention. Visual frame 600 includes contextual background 624 and viewing pane 614, corresponding to contextual background 424 and viewing pane 414, in FIG. 4. Also shown on visual frame 600 is parental rating graphic 626, having no analogue in FIG. 4.

As may be seen from the embodiment of FIG. 6, during presentation, viewing pane 614 may dominate the display area. Contextual background 624 is shown as a neutral background, but may remain subtly contextual, such as use of a neutral but gray background color during presentation of an episode of Grey's Anatomy, for example. As shown in the present embodiment, parental rating graphic 626 is displayed against the contextual background, and does not overlay viewing pane 614. In other embodiments, or where the consumer has adjusted the size of the viewing pane, either by scaling the viewing pane or by selecting a predetermined viewing pane size that does not provide room for parental rating graphic 626 to appear on the contextual background, parental rating graphic 626 may be displayed partially or entirely overlaying a portion of viewing pane 614.

In one embodiment, display of parental rating graphic 626 is performed by parental rating notifier 222a or 222b, under the control of respective presentation control application 220a or 220b, which can be configured to ensure display of parental rating graphic 626 according to a parental rating display protocol. For example, the parental rating display protocol may require that parental rating display graphic 626 be displayed for at least fifteen seconds at a time. Moreover, presentation control application 220a or 220b can be configured to assure that parental rating graphic 626 is displayed not less frequently than once every thirty minutes during presentation. For example, parental rating graphic 626 may be displayed for fifteen seconds or more each time the consumer is redirected briefly away from presentation of the digital multimedia content item being shown on viewing panel 614, such as during an advertising interval. In addition, the parental rating may be automatically re-displayed at resumption of the presentation after a pause, regardless of the passage of time, or, alternatively, after thirty minutes have elapsed regardless of progression through the presentation.

Thus, the system and method for providing digital multimedia presentations disclosed in the present application enhance and render the consumer experience of identifying and accessing digital multimedia content easier, more enjoyable, and more intuitive. By providing consumers with features such as hierarchical directional navigation, enabling, for example, lateral and zoom navigation among sets, subsets, and items of digital multimedia content, the present disclosure describes an approach that advantageously facilitates understanding of the hierarchical relationship among content items. By organizing and grouping digital multimedia content items into sets and subsets corresponding to the consumer's actual experience, such as organizing content by collecting series television episodes together, and grouping those episodes by broadcast seasons, the disclosed embodiments further enhance the ability of a consumer to locate and access content that is genuinely of interest to them. Moreover, by providing visual cues such as contextual backgrounds corresponding to displayed sets of digital multimedia content, the present solution stimulates an intuitive recognition of sought after content.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. It should also be understood that the invention is not limited to the particular embodiments described herein, but is capable of many rearrangements, modifications, and substitutions without departing from the scope of the invention.

What is claimed is:

1. A system for providing a digital multimedia presentation, the system comprising:
   a presentation server;
   a presentation content database accessible through the presentation server, the presentation content database configured to store a plurality of digital multimedia content items;
   a presentation control application configured to enable identification of a digital multimedia content item for presentation from among the plurality of digital multimedia content items, by:
   enabling user selection of presentation preferences including additional display features, including scaling for adjusting a size of a viewing pane, for the digital multimedia content item;
   organizing the plurality of digital multimedia content items into digital multimedia content sets displayed on a selection plane;
   enabling navigation in a first navigation mode corresponding to a lateral navigation on the selection plane;
   grouping the plurality of digital multimedia content items into grouping subsets displayed on a presentation plane;
   enabling navigation in the first navigation mode on the presentation plane, the presentation plane configured to display a contextual background corresponding to a theme of a selected digital multimedia content set and the grouping subsets, wherein the contextual background comprises at least one of one or more dynamic graphical assets and one or more interactive graphical assets;
   enabling navigation in a second navigation mode corresponding to a zoom navigation between the selection plane and the presentation plane;
   identifying the digital multimedia content item from the plurality of digital multimedia content items for presentation;
   sending the digital multimedia content item to a client computer; and
   activating selected additional display features from the presentation preferences.

2. The system of claim 1, wherein the presentation control application is further configured to display a parental rating graphic assigned to the digital multimedia content item for at least a predetermined period each time the presentation of the digital multimedia content item resumes after an advertising interval.

3. The system of claim 1, wherein the presentation control application executes as a server based application.

4. The system of claim 1, wherein the digital multimedia content sets each comprise programming for a single television series.

5. The system of claim 1, wherein the grouping subsets correspond to single seasons of programming for a single television series.

6. The system of claim 1, wherein the presentation control application is configured to stream the digital multimedia content item for presentation to client computer.

7. The system of claim 1, further comprising a client computer.

8. The system of claim 7, wherein the presentation control application executes as a desktop application on the client computer.

9. The system of claim 7, wherein the client computer comprises a client-side system selected from the group consisting of a personal computer, a mobile telephone, personal digital assistant (PDA), gaming console, and a home entertainment system.

10. The system of claim 1, wherein the contextual background comprises the one or more dynamic graphical assets and the one or more interactive graphical assets.

11. A method of providing a digital multimedia presentation, the method comprising:
   enabling user selection of presentation preferences including additional content display features, including scaling for adjusting a size of a viewing pane, for the digital multimedia content item;
   making a first selection format available for viewing on a selection plane, the first selection format displaying a plurality of digital multimedia content sets;
   enabling navigation in a first navigation mode corresponding to a lateral navigation between the first selection format and a second selection format on the selection plane;
   determining a selected digital multimedia content set from the plurality of digital multimedia content sets shown on the selection plane;
   executing navigation in a second navigation mode corresponding to a zoom navigation into the selected digital multimedia content set, resulting in display of a plurality of digital multimedia content items on a presentation plane, the plurality of digital multimedia content items grouped into grouping subsets associated with the selected digital multimedia content set;
   enabling navigation in the first navigation mode among the plurality of digital multimedia content items shown on the presentation plane, the presentation plane configured to display a contextual background corresponding to a theme of the selected digital multimedia content set and the grouping subsets, wherein the contextual background comprises at least one of one or more dynamic graphical assets and one or more interactive graphical assets;
   identifying a digital multimedia content item for presentation;
   sending the digital multimedia content item to a client computer; and
   activating selected additional display features from the presentation preferences.

12. The method of claim 11, wherein the sending comprises streaming the identified digital multimedia content item to the client computer.

13. The method of claim 11, further comprising displaying a parental rating graphic assigned to the digital multimedia content item for at least a predetermined period each time the presentation of the digital multimedia content item resumes after an advertising interval.

14. The method of claim 11, wherein the plurality of digital multimedia content sets comprise programming for a single television series.

15. The method of claim 11, wherein the grouping subsets correspond to single seasons of programming for a single television series.

16. The method of claim 11, wherein the contextual background comprises the one or more dynamic graphical assets and the one or more interactive graphical assets.

* * * * *

UNITED STATES PATENT AND TRADEMARK OFFICE
CERTIFICATE OF CORRECTION

| | | |
|---|---|---|
| PATENT NO. | : 8,386,942 B2 | Page 1 of 1 |
| APPLICATION NO. | : 12/228508 | |
| DATED | : February 26, 2013 | |
| INVENTOR(S) | : Barsook et al. | |

It is certified that error appears in the above-identified patent and that said Letters Patent is hereby corrected as shown below:

In the Claims

Column 12, line 12, "additional content display" should be changed to --additional display--.

Signed and Sealed this
Eighteenth Day of February, 2014

Michelle K. Lee
*Deputy Director of the United States Patent and Trademark Office*